United States Patent [19]

Agnihotri et al.

[11] Patent Number: 4,842,748

[45] Date of Patent: Jun. 27, 1989

[54] METHODS FOR REMOVING VOLATILE SUBSTANCES FROM WATER USING FLASH VAPORIZATION

[75] Inventors: Chaitanya Agnihotri, Cedar Knolls; Robert M. Cobiella, Lakewood, both of N.J.

[73] Assignee: Assigned to the Government of the United States as represented by the Administrator of the U.S. Environmental Protection Agency, Washington, D.C.

[21] Appl. No.: 158,968

[22] Filed: Feb. 23, 1988

[51] Int. Cl.⁴ ............................................. B01D 17/00
[52] U.S. Cl. ..................................... 210/774; 203/11; 203/25; 203/42; 203/DIG. 4; 210/808
[58] Field of Search ............... 203/11, 42, 25, DIG. 4; 210/774, 808

[56] References Cited

U.S. PATENT DOCUMENTS

| | | |
|---|---|---|
| 3,501,384 | 3/1970 | Starmer . |
| 3,884,767 | 5/1975 | Pottharst, Jr. . |
| 3,990,951 | 11/1976 | Rajakovics . |
| 4,209,364 | 6/1980 | Rothschild ........................... 203/11 |
| 4,341,601 | 7/1982 | Hartig . |
| 4,470,909 | 9/1984 | Bright . |

*Primary Examiner*—Frank Sever
*Attorney, Agent, or Firm*—Benjamin H. Bochenek

[57] ABSTRACT

Methods for removing volatile organic substances from water employ flash vaporization techniques. The methods comprise providing water which contains volatile organic substances and is at a pressure of at least about 35 psig, releasing the water into a vacuum chamber maintained under a vacuum in the range of about 1 to about 5 psia, removing resulting vapors from the chamber, and collecting liquid water from the chamber. At least a portion of the volatile organic substances originally contained in the water are removed as vapors from the vacuum chamber.

10 Claims, 1 Drawing Sheet

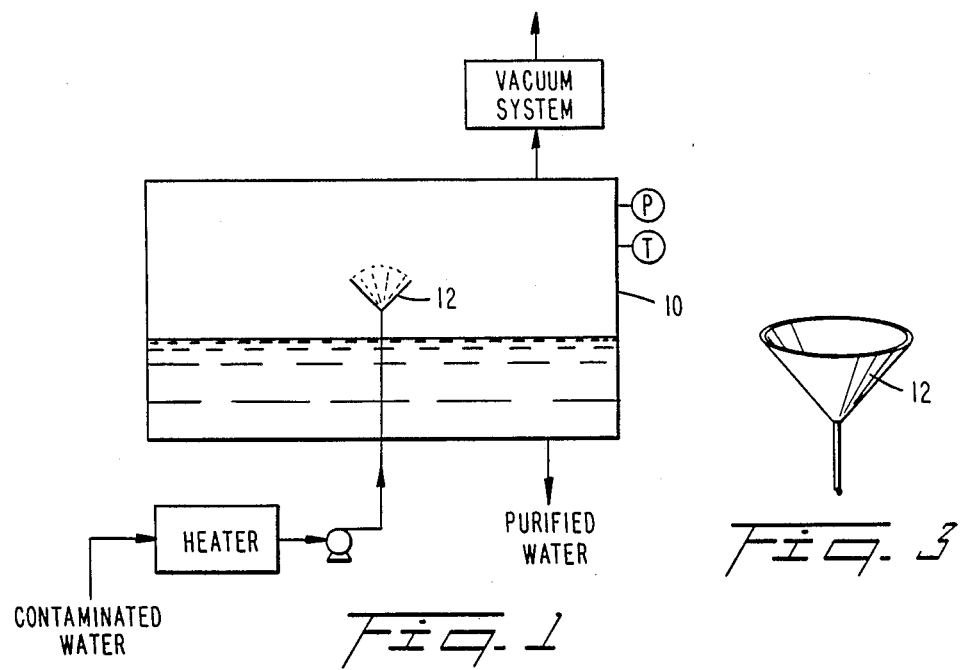
Fig. 1
Fig. 3
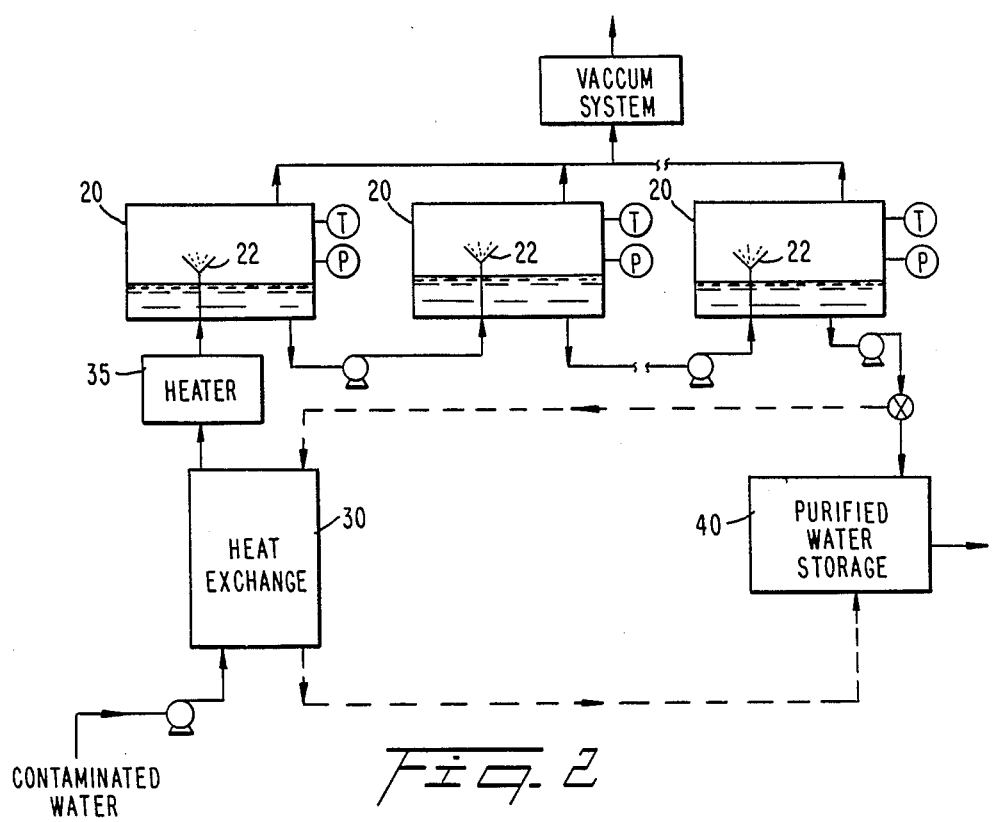
Fig. 2

METHODS FOR REMOVING VOLATILE SUBSTANCES FROM WATER USING FLASH VAPORIZATION

FIELD OF THE INVENTION

The present invention relates to methods for removing volatile substances from water using flash vaporization techniques. According to the methods of the invention, volatile organic substances contained in water are removed as vapors when pressurized water containing the substances is released into a vacuum chamber.

BACKGROUND OF THE INVENTION

Many of our water sources have become contaminated with various types of chemicals which are hazardous to human health. Removal of the contaminants is often difficult and costly, both for large consumers, for example, industrial concerns, and for small consumers, for example, domestic ground water well owners. One type of contaminant which is particularly difficult and costly to remove comprises volatile substances and, more specifically, volatile organic chemicals such as halogenated hydrocarbons. In the context of this invention, volatile substances are generally defined as materials having higher pure component vapor pressures and lower boiling points then water.

Various methods are known for removing halogenated hydrocarbons and other contaminants from water. For example, the Bright U.S. Pat. No. 4,470,909 discloses a method for extracting halogenated hydrocarbons from water by contacting an aqueous solution containing halogenated hydrocarbons with a phosphine oxide. The Rajakovics U.S. Pat. No. 3,990,951 discloses a method for purifying water, particularly radioactive waste water, employing evaporation and degassing steps. The Hartig U.S. Pat. No. 4,341,601 discloses a water evaporation process useful in water desalination and purification wherein water is converted to steam in a falling film evaporator apparatus and the resultant steam is condensed to provide fresh water. The Starmer U.S. Pat. No. 3,501,384 similarly discloses a method for the production of distilled or potable water from sea water or brackish water using a multi-stage flash evaporator in which the water is purified by evaporation. The Pottharst, Jr. U.S. Pat. No. 3,884,767 discloses a similar multi-effect flash evaporator method and apparatus for purifying water, for example, sea water.

With an increasing number of our water sources being contaminated, a need exists for additional methods which are simple and energy efficient for removing the contaminants to provide potable water supplies.

SUMMARY OF THE INVENTION

Accordingly, it is an object of the present invention to provide a method for removing volatile substances, particularly volatile organic contaminants, from water. It is an additional object of the present invention to provide methods for removing volatile organic substances from water, which methods are simple and energy efficient in removing the contaminating substances. It is a related object of the invention to provide methods for removing volatile organic substances from water wherein the method conditions may be particularly selected for use in connection with a water source depending on the type of volatile organic contaminating substances present in the water source and the concentration of the contaminating substances in the water source.

These and additional objects are provided by the methods of the present invention for removing volatile substances from water. The methods of the invention employ flash vaporization techniques, and, more particularly, adiabatic flash vaporization techniques under partial vacuum conditions. The methods comprise providing water which contains volatile organic contaminating substances at a pressure of at least about 35 psig, releasing the water into a vacuum chamber maintained under a vacuum in the range of about 1 to about 5 psia, removing resulting vapors from the chamber and collecting liquid water from the chamber. At least a portion of the volatile organic substances originally contained in the water are removed as vapors from the vacuum chamber. Although a small portion of water may be removed from the chamber as vapors, the majority of the water is collected from the chamber as a purified liquid.

Generally, the methods according to the present invention may be used to purify water sources containing volatile organic substances in various concentrations ranging, for example, from 0.5 ppb to 100 ppm and higher. Although the particular removal rate achieved by the methods according to the present invention depends on the type of volatile organic substances and their concentration in the water source, the methods of the present invention commonly remove up to 90 percent or more, often up to 99 percent or more, of the dissolved volatile organic contaminating substances contained in the water source.

These and additional objects and advantages according to the present invention will be more apparent in view of the following detailed description.

BRIEF DESCRIPTION OF THE DRAWING

The following detailed description will be more fully understood in view of the drawing in which:

FIG. 1 represents a schematic view of a first embodiment of a method according to the present invention;

FIG. 2 represents a schematic diagram of a second embodiment of a method according to the present invention; and FIG. 3 represents a schematic diagram of a spray nozzle which may be employed in the methods of the present invention.

DETAILED DESCRIPTION

The methods according to the present invention for removing volatile organic substances from water employ flash vaporization techniques. Water which contains the volatile organic contaminating substances is provided under pressure and released into a vacuum chamber. Resulting vapors are removed from the chamber, preferably by a vacuum pump system, and liquid water is collected from the chamber. The methods are conducted substantially adiabatically. Dissolved volatile organic chemicals contained in the water are dislodged from the water through the sudden pressure release and are removed by quick suction of the resulting vapor molecules of contaminant. As will be set forth in detail below, the pressure and temperature conditions of the methods may be controlled within predetermined ranges in order to achieve the desired separation and removal of the volatile organic substances from the water. The treated water is thus rendered free from volatile organic contaminants and is suitable for potable use. Because the methods according to the present invention employ relatively simple operating conditions and apparatus yet provide energy efficient removal of volatile organic substances, the methods may be particularly adapted for relatively small consumer use, for example, domestic well water supplies, as well as for larger consumers, for example, industrial concerns.

The methods according to the present invention will be more fully described with reference to FIG. 1. Water from a contaminated source, for example, a contaminated ground well, containing volatile organic substances in concentrations, for example, up to 100 ppm or more, is pumped to a pressure of at least about 35 psig. Preferably, the water is provided at a pressure in the range of about 35 to about 50 psig although higher pressures may be employed. Although not shown in FIG. 1, the contaminated water may be forwarded to a feed tank from which it is subsequently drawn under pressure for use in the methods of the invention. The water which is provided at a pressure of at least about 35 psig may also be heated in order to facilitate the removal of the volatile organic substances therefrom. Generally, heating the feed water is optional for removal of some types of volatile organic substances although for other types of volatile organic substances heating is necessary in order to efficiently remove the contaminants. In a preferred embodiment, the feed water is heated to a temperature between 140° F. and 180° F. Heating may be effected by an electric heat source and/or indirect heat exchange with hot air, water or the like.

The pressurized, and optionally heated, water containing the volatile organic substances is delivered to and released into a vacuum chamber 10 as shown in FIG. 1. The vacuum chamber 10 is maintained under a vacuum in the range of about 1 to about 5 psia. This range includes vacuums slightly lower than 1 psia also. The vacuum at which the vacuum chamber is maintained may be adjusted depending on the concentration of volatile organic substances contained in the water source. As shown in FIG. 1, the water is released through a spray nozzle 12 which creates fine droplets. The sudden pressure release dislodges the volatile organic chemicals from the water and the vacuum suction quickly removes the resultant vapor molecules from the chamber. Although, depending on the temperature and pressure of the vacuum chamber, a relatively small amount of water may also be vaporized with the volatile organic substances, the majority of the water remains in the liquid phase and is collected from the chamber, for example, at the bottom of the chamber. At least a portion of the volatile organic substances originally contained in the water are removed as vapors from the vacuum chamber. In many instances, the aforementioned method effects greater than about 90 percent removal, and in many instances up to about 99 percent removal, of the volatile organic substances originally contained in the water.

In a preferred embodiment, the purified water is collected in the bottom of the vacuum chamber and the spray nozzle through which the contaminated water is released as fine droplets is located above the collected water level as is shown in FIG. 1. The spray nozzle may be arranged such that the water released therethrough impinges onto a wall of the vacuum chamber in order to further assist in dislodging the volatile organic substance vapors from the water. Preferably, the water is also released in a substantially upward direction. A suitable velocity for delivering the water to the vacuum chamber has been found to be in the range of about 5 to about 10 ft/sec, although other velocities may be employed.

The vapors which are formed in the vacuum chamber may be removed from the chamber by means of a vacuum pump system. The vapors may be stack discharged to the atmosphere wherever such discharge is acceptable. Alternatively, the vapors may be passed through suitable purifying means, for example, an activated carbon bed, if necessary, prior to discharge to the atmosphere.

FIG. 2 discloses a second embodiment of the method according to the present invention wherein multiple flash vaporization stages are employed. With reference to FIG. 2, each flash vaporization stage includes a vacuum chamber 20 to which pressurized water containing volatile organic substances is delivered by a spray nozzle 22. The flash vaporization stages are connected in series. Although three stages are shown in FIG. 2, two, four or more stages may be employed in series.

The same pressure and temperature conditions as discussed above with reference to a single stage method as shown in FIG. 1 may be employed in the multistage flash vaporization method of FIG. 2. The water which is collected from the first flash vaporization stage is pumped under pressure and delivered to the vacuum chamber of the second flash vaporization stage where it is released through the spray nozzle. At least a portion of any volatile organic substances remaining in the water collected in the vacuum chamber of the first flash vaporization stage is removed as vapors from the vacuum chamber of the second flash vaporization stage. The purified liquid water collected in the second flash vaporization stage may then be forwarded to one or more additional flash vaporization stages as set forth in FIG. 2 for further removal of any remaining volatile organic substances.

In a preferred embodiment, the purified water from the last flash vaporization stage may be indirectly contacted with the contaminated water which is supplied to the first flash vaporization stage for indirect heat exchange as shown at 30 in FIG. 2. The contaminated water may then be further heated in heater 35 if necessary prior to delivery to the first stage. The purified water from the last flash vaporization stage may then be forwarded to a purified water storage tank 40 for consumer use. The vapors which are removed in each of the flash vaporization stages of the multistage method may be stack discharged to the atmosphere where acceptable or, alternatively, may be passed through a purifying means such as an activated carbon bed, if necessary, prior to discharge to the atmosphere. Each flash vaporization step causes a drop in the water temperature and the overall temperature drop together with the operating vacuum which is maintained determine the total loss of water through vaporization with the volatile organic substances.

Thus, the methods according to the present invention provide a simple yet efficient means for removing volatile organic substances from water. The apparatus which is required for implementing the methods of the present invention comprise basic components which may be preassembled, skid mounted and easily transportable to a contaminated water source if desired.

FIG. 3 discloses a schematic diagram of a preferred embodiment of the spray nozzle employed in the methods of the present invention. Preferably, the nozzle provides a spherical spray pattern of the water which is released in order to facilitate dislodging of the volatile organic substance molecules from the water.

The methods of the present invention may be used to remove various volatile substances from water. The methods are particularly adapted for removing volatile organic chemicals including both halogenated and non-halogenated compounds from water. Suitable volatile organic chemicals which may be removed from water using the methods of the present invention include, but are not limited to, tri- and tetrachloroethylene, cis- and trans-1,2-dichloroethylene, 1,1-dichloroethylene, vinyl and methylene chloride, 1,1,1-tri-chloroethane, 1,2-dichloroethane, carbon tetrachloride, benzene, chlorobenzene, 1,2-, 1,3- and 1,4-dichlorobenzene, and 1,2,4-trichlorobenzene.

The preceding preferred embodiments are set forth to illustrate specific embodiments of the invention and are not intended to limit the scope of the methods and apparatus of the present invention. Additional embodiments and advantages within the scope of the claimed invention will be apparent to one of ordinary skill in the art.

What is claimed is:

1. A method for removing volatile organic substances from water, said volatile organic substances, including halogenated hydrocarbons, having higher pure component vapor pressures and lower boiling points than water, comprising the steps of (a) providing water that contains the volatile organic substances, including halogenated hydrocarbons, and is at a pressure of at least about 35 psig and a temperature in the range of about 140° F. to about 180° F., (b) releasing the water into a vacuum chamber maintained under a vacuum in the range of about 1 to about 5 psia, (c) removing resulting vapors from the chamber through a vacuum pump system, and (d) collecting purified liquid water from the chamber, at least a portion of the volatile organic substances originally contained in the water being removed as vapors from the vacuum chamber.

2. A method as defined by claim 1, wherein the water is provided at a pressure in the range of about 35 to about 50 psig.

3. A method as defined by claim 1, wherein the water is released into the vacuum chamber as fine droplets through a spray nozzle located above the collected water level.

4. A method as defined by claim 3, wherein the spray from the spray nozzle impinges on a wall of the vacuum chamber.

5. A method as defined by claim 1, wherein the resulting vapors are removed from the vacuum chamber by a vacuum pump system.

6. A method as defined by claim 1, wherein the method is performed adiabatically.

7. A method as defined by claim 1, wherein the water originally contains less than 100 ppm volatile organic substances and greater than about 90 percent of the volatile organic substances originally contained in the water is removed.

8. A method as defined by claim 1, including the additional steps of pumping the collected water to a pressure of at least about 35 psig, releasing the water into a second vacuum chamber maintained under a vacuum in the range of about 1 to about 5 psia, removing resulting vapors from the second chamber, and collecting liquid water from the second chamber, at least a portion of any volatile organic substances remaining in the water collected in the first vacuum chamber being removed as vapors from the second vacuum chamber.

9. A method as defined by claim 8, wherein the additional steps are repeated in at least one additional vacuum chamber and at least a portion of any volatile organic substances remaining in the water collected in the previous vacuum chamber is removed as vapors from the subsequent vacuum chamber.

10. A method as defined by claim 1, wherein a majority of the water which is released into the vacuum chamber is collected from the chamber as the purified liquid water.

* * * * *